Aug. 7, 1934.    S. RAEMER    1,969,385
MEASURING DEVICE
Filed May 21, 1934
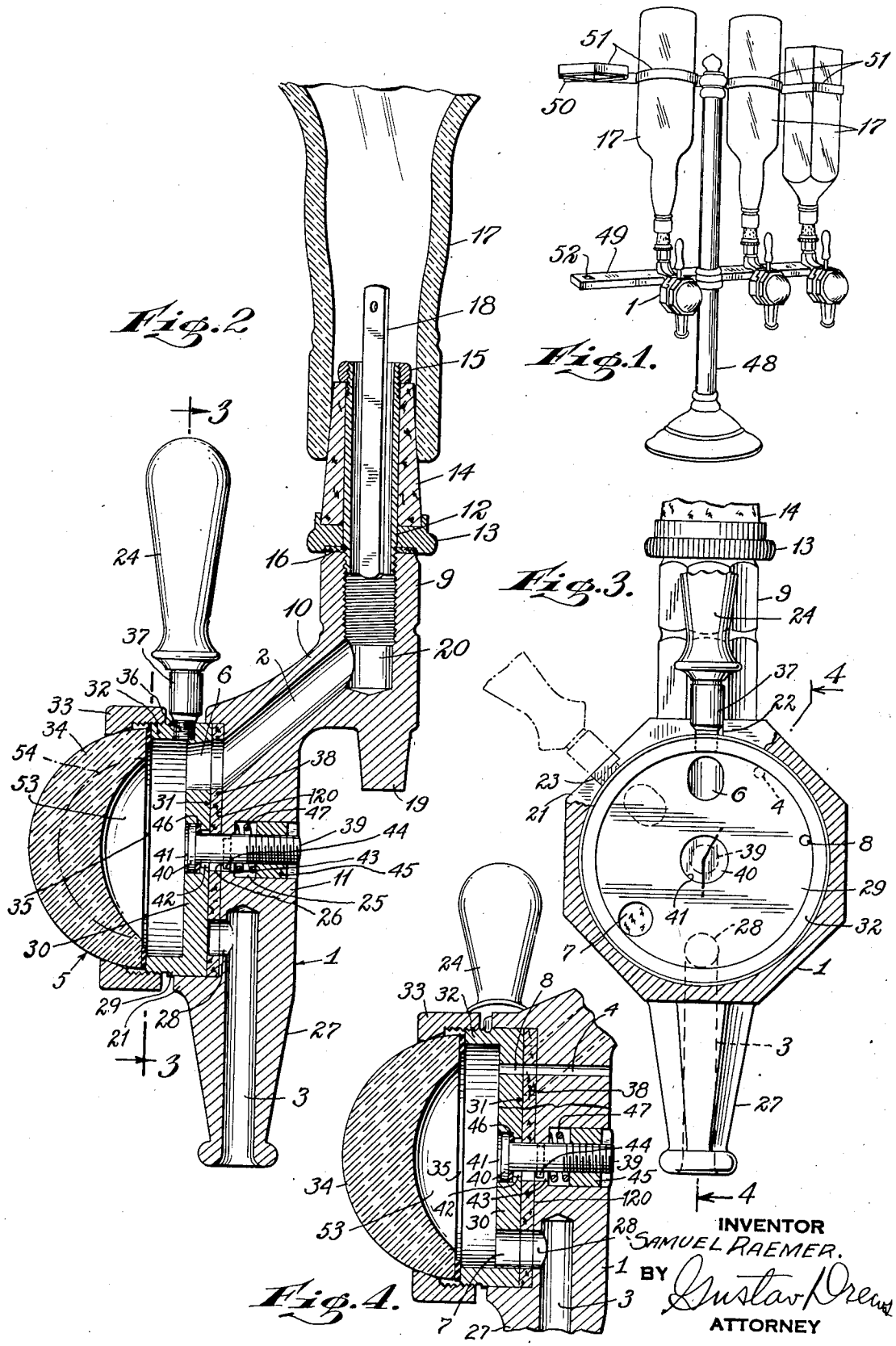
INVENTOR
SAMUEL RAEMER.
BY Gustav Drew
ATTORNEY Patented Aug. 7, 1934

1,969,385

UNITED STATES PATENT OFFICE 1,969,385

MEASURING DEVICE

Samuel Raemer, New York, N. Y.

Application May 21, 1934, Serial No. 726,697

6 Claims. (Cl. 221—116)

This invention relates to measuring devices in general and more especially to devices associated with spigots, faucets and the like for measuring liquids and the like.

Among the objects of the present invention, it is aimed to provide an improved measuring device associated with a spigot or the like for dispensing a predetermined measure of liquid preferably having a handle disposed in a vertical upwardly extending direction in alinement with the spigot and an upwardly extending supply connection when the spigot dispensing outlet is closed and the inlet for the measuring reservoir is open for segregating a predetermined amount of liquid to prepare for a dispensing operation and which handle will be inclined from the vertical when the spigot dispensing outlet is open and the inlet for the measuring reservoir is closed for dispensing the measured amount of liquid so segregated.

It is still another object of the present invention to provide an improved measuring device associated with a spigot for dispensing a predetermined measure of liquid having a reservoir housing for receiving a segregated amount of liquid and having a handle fixed to rotate with the housing relative to a bracket containing a flat valve seat for two valves, one valve for the supply inlet to said reservoir and the other for the discharge outlet from said reservoir, the reservoir housing having a flat face to engage said flat valve seat and having a supply inlet to register with the supply inlet in said bracket in one position of said housing and having a discharge opening to register with the discharge opening in said bracket in another position of said housing.

It is still another object of the present invention to provide an improved measuring device associated with a spigot for dispensing a predetermined amount of liquid having a reservoir housing consisting in part of a glass or transparent wall to facilitate inspection of the liquid segregated, a handle fixed to said housing, and a flat valve face having a supply inlet, a discharge outlet and an air vent to cooperate with a bracket having a flat face faced with a yieldable sheet of cork or the like having a supply inlet, a discharge outlet and an air vent, the supply inlet of said bracket to register with the supply inlet of said housing in one position of said handle and the discharge outlet and air vent of said bracket registering with the discharge outlet and air vent of said housing in another position of said handle, and a yieldable device for pressing said housing so that its flat face snugly engages the flat cork face of said bracket positively to insure against leakage.

These and other features, capabilities and advantages of the invention will appear from the subjoined detail description of one specific embodiment thereof illustrated in the accompanying drawing in which Figure 1 is a perspective of a stand equipped with embodiments of the present invention;

Fig. 2 is a transverse section of a measuring device made according to the present invention with a portion of the bottle associated therewith;

Fig. 3 is a section on the line 3—3 of Fig. 2; and

Fig. 4 is a section substantially along the line 4—4 of Fig. 3 showing the discharge outlets in registration as distinguished from Fig. 3 where the inlet outlets are shown in registration.

The measuring device consists essentially of a bracket 1 having an inlet passage 2, a discharge passage 3 and an air vent 4 and a housing 5 having an inlet passage 6, an outlet passage 7 and a vent 8.

The housing 5 is adapted to be rotated relative to the bracket 1 so that in one position, see Figs. 3 and 2, the inlet passages 2 and 6 will register with one another and in another position, see Fig. 4, the discharge passages 3 and 7 will register with one another and in such latter position, the air vents 4 and 8 will also register with one another.

The bracket 1 consists essentially of an upwardly extending chambered portion 9, an intermediate neck portion 10 and a main body portion 11. The chambered portion 9 is preferably internally screw threaded to receive a cork fixture consisting essentially of an inner cylindrical member 12 fixed to an enlarged annular member 13 to form an abutment for the enlarged end of a cork member 14 secured in place by a small annular portion 15 threadedly connected to the upper end of the cylinder 12 and pressing the cork member 14 into intimate engagement with the annular portion 13.

To form a liquid tight connection, the annular portion 13 is preferably recessed to receive a suitable washer, as for instance the washer 16 composed of cork or the like to resiliently engage the upper edge of the body portion 11.

To facilitate discharge of liquid from a bottle 17, the cylindrical portion 12 is preferably provided with a partition 18 fixed in place to the inner periphery of the cylindrical portion 12.

The cork 14 as shown in Fig. 2 is adapted to receive the neck of an inverted bottle 17. The lower end of the chambered portion 9 is preferably provided with a four sided downwardly extending tapered stud 19. The chamber 20 of the chambered portion 9 communicates with the downwardly inclined passage 2 extending through the neck 10. The body 11 is preferably provided with a flat disc face 120 offset from a shoulder 21 having an inner circular periphery and in the present instance having a substantially hexagonal outer face.

The shoulder 21 is interrupted from the point 22 to the point 23 to form limiting stops for the handle 24 associated with the housing 5. The body 11 furthermore is provided with an enlarged cylindrical chamber 25 substantially concentric with the flat face 120. This chamber 25 terminates in the rear face of the body portion 11 and communicates with a diminished opening 26 terminating in the flat face 120.

Downwardly from the body portion 11, there extends the spigot conformation 27 having a vertically extending passage 3 communicating with the laterally extending passage 28 terminating in the flat face 120. The air vent 4, see Fig. 3, extends through the body portion 11 from the flat face 120 to the rear face of such body portion.

The housing 5 is provided with a cup shaped metallic member 29 having a disc portion 30 provided with an outer flat face 31 and an annular rim 32 having an outer screw thread to receive the inner thread of the locking collar 33 for anchoring the glass wall 34 in place. Preferably as shown, there is provided an annular washer 35 composed of cork or the like between the opposing edges of the rim 32 and the glass wall 34 to form a liquid tight connection when the anchoring ring 33 is screwed into place.

The cup 29 is also provided with a screw threaded opening to receive the threaded end 36 of the handle 24 extending radially from the rim 32 as shown in Figs. 2 and 3 so that its intervening cylindrical portion 37 may cooperate with the stops 22 and 23 on the shoulder 21.

The flat face 120 of the bracket 1 is preferably provided with a cork disc 38 having openings therein to register with the openings 2, 28, 4 and 26 of the body portion 11. For anchoring the housing 5 in fluid tight relation to the bracket 1, the connection now to be described is provided.

It consists of a pin 39 having a head 40 resting in the enlarged recessed portion 41 of the disc 30 with the stem of the pin 39 extending through the smaller opening 42 and then through the central opening in the cork 38 and the openings 26 and 25 in the body portion 11. The opening 26 is provided with a short indent 43 to receive the projection 44 extending from the pin 39 and thus anchor the pin 39 against rotation relative to the bracket 1 and permit the cylindrical collar 45 to be properly secured in place on the threaded end of the pin 39.

Between the head 40 and the inner face of the enlarged opening 41 of the disc 30 there is provided a washer 46 preferably composed of cork or the like and between the inner face of the opening 25 of the body portion 11 and the collar 45, there is preferably tensed a spring 47 as a result of which the cork disc 38 will be tightly pressed between the flat face 31 of the disc 30 and the flat face 120 of the body portion 11 to form a fluid tight valve seat, while the cork washer 46 will form a fluid tight connection between the head 40 of the pin 39 and the disc 30.

In use, see Fig. 1, there is generally provided a rack consisting of a standard 48 having a transverse bar 49 and a transversely extending bracket 50.

The bracket 50 is preferably provided with a plurality of collars 51 of different shapes to conform to the outer periphery of different shaped bottles. The crossbar 49 is preferably provided with rectangular recesses 52 to conform to and receive the tapered studs 19 of brackets 1. There are generally provided as many recesses 52 as collars 51, one recess for each collar in alinement therewith as illustrated in Fig. 1.

In use, the body portions of the bottles 17 will extend through the collars 51, the corks 14 being inserted in the mouths of the bottles 17 and the studs 19 being inserted into the recesses 52. In closed position of the discharge nozzle 27, the handle 24 must be swung up into vertical position where its cylindrical portion 37 engages the stop 22. In this position of the handle 24, the opening 6 will register with the opening 2 and permit the liquid from the bottle 17 to pass down into the chamber 53. When the chamber 53 is filled, the device is ready to dispense a portion of liquid.

Assuming that the chamber 53 is constructed to accommodate an ounce of liquid, it will be apparent that there will be segregated in the housing 5 an ounce of liquid immediately that the handle 24 is turned to the left to shut off the opening 2. It will also appear that when the handle is partly turned to the left to shut off the opening 2 and before it has been turned far enough to cause the opening 7 to register with the opening 28, an ounce of liquid will so be segregated from the remaining liquid contained in the bottle 17 and associated apparatus. Thereupon, if a glass is disposed beneath the spigot 27, the movement of the handle 24 over into position to engage the stop 23 will cause the opening 7 to register with the opening 28 and the air vent 8 to register with the air vent 4 to permit the ounce of liquid in the chamber 53 to be discharged.

Should it be desired to dispense more than an ounce of liquid, it will only be necessary to take a differently formed glass wall 34. As an instance if the glass wall 34 were formed to have an inner face along the dash and dot line 54, cut to cooperate with the inner area of the cup 29 to accommodate one and a half ounces of liquid, it will be obvious that one and a half ounces of liquid can with facility be segregated in the chamber 53 by merely moving the handle 24 into its vertical position until the chamber 53 is filled and then moving the handle over to shut off the opening 2. Of course, in actual use, the segregation will not be a separate action but immediately precede the dispensing of a portion of liquid.

It is obvious that various changes and modifications may be made to the details of construction without departing from the general spirit of the invention as set forth in the appended claims.

I claim:

1. The combination with a bracket having a supply passage and a discharge passage, of a flat valve face coextensive with the discharge end of said supply passage and the inlet end of said discharge passage, a measuring housing having a supply passage and a discharge passage, a flat valve face coextensive with the inlet end of the supply passage of said housing and with the discharge end of the discharge passage of said housing, yieldable means for the valve face of said bracket, resilient means for pressing the valve face of said housing, said yieldable means and the valve face of said bracket into fluid tight engagement with one another, and a handle fixed to said housing to facilitate rotating said housing relative to said bracket in one position to cause said discharge passages and in the other position to cause said inlet passages to register with one another.

2. The combination with a bracket having a supply passage and a discharge passage, of a flat valve face coextensive with the discharge end of said supply passage and the inlet end of said discharge passage, a measuring housing having a supply passage and a discharge passage, a flat valve face coextensive with the inlet end of the supply passage of said housing and with the discharge end of the discharge passage of said housing, yieldable means for the valve face of said bracket, resilient means for pressing the valve face of said housing, said yieldable means and the valve face of said bracket into fluid tight engagement with one another, a shoulder extending from the edge of the valve face of said bracket and interrupted to form two stops, and a handle fixed to said housing to facilitate rotating said housing relative to said bracket to engage either one or the other of said stops, the engagement of said handle with one of said stops positioning the discharge passages to register and the inlet passage of the bracket to close and the engagement of said handle with the other of said stops positioning the inlet passages to register and the discharge passage of the bracket to close.

3. The combination with a bracket having a supply passage, a discharge passage and an air vent, of a flat valve face coextensive with the discharge end of said supply passage the inlet end of said discharge passage and the discharge end of said air vent, a measuring housing having a supply passage a discharge passage and an air vent, a flat valve face coextensive with the inlet end of the supply passage of said housing, with the discharge end of the discharge passage of said housing and with the inlet end of the air vent of said housing, yieldable means for the valve face of said bracket, resilient means for pressing the valve face of said housing, said yieldable means and the valve face of said bracket into fluid tight engagement with one another, and a handle fixed to said housing to facilitate rotating said housing relative to said bracket in one position to cause said discharge passages and said air vents to register with one another and in the other position to cause said inlet passages to register with one another.

4. The combination with a bracket having a supply passage, a discharge passage and an air vent, of a flat valve face coextensive with the discharge end of said supply passage, the inlet end of said discharge passage and the discharge end of said air vent, a measuring housing having a supply passage, a discharge passage and an air vent, a flat valve face coextensive with the inlet end of the supply passage of said housing, with the discharge end of the discharge passage of said housing and with the inlet end of the air vent of said housing, yieldable means for the valve face of said bracket, resilient means for pressing the valve face of said housing said yieldable means and the valve face of said bracket into fluid tight engagement with one another, a shoulder extending from the edge of the valve face of said bracket and interrupted to form two stops, and a handle fixed to said housing to facilitate rotating said housing relative to said bracket to engage either one or the other of said stops, the engagement of said handle with one of said stops positioning the discharge passages and the air vents to register with one another and the inlet passage of the bracket to close and the engagement of said handle with the other of said stops positioning the inlet passages to register and the discharge passage and the air vent of the bracket to close.

5. The combination with a bracket having a chambered portion extending vertically in an upward direction, of a spigot extending vertically in a downward direction, the chambered portion having a supply passage and the spigot having a discharge passage, a flat vertically extending valve face coextensive with the discharge end of said supply passage and the inlet end of said discharge passage, a measuring housing having a supply passage and a discharge passage, a flat vertically extending valve face coextensive with the inlet end of the supply passage of said housing and with the discharge end of the discharge passage of said housing, yieldable means for the valve face of said bracket, resilient means for pressing the valve face of said housing said yieldable means and the valve face of said bracket into fluid tight engagement with one another, a shoulder extending from the edge of the valve face of said bracket and interrupted to form two stops, one stop at the upper end of the valve face of said bracket and the other stop positioned laterally of said first stop, and a handle fixed to extend radially from said housing and to facilitate rotating said housing relative to said bracket to engage either one or the other of said stops, the engagement of said handle with the upper of said stops positioning the handle in vertical alinement with said spigot and chambered portion and positioning the discharge passages to register and the inlet passage of the bracket to close and the engagement of said handle with the laterally positioned stop positioning said handle inclined from the vertical and positioning the inlet passages to register with one another and the discharge passage of the bracket to close.

6. The combination with a bracket having a supply passage and a discharge passage, of a flat valve face coextensive with the discharge end of said supply passage and the inlet end of said discharge passage, a measuring housing consisting of a metallic cup, an anchoring ring to accommodate and secure different sized glass caps to said cup, and a glass cap to be secured to said cup by said anchoring ring, said cup having a supply passage and a discharge passage, a flat valve face coextensive with the inlet end of the supply passage of said cup and with the discharge end of the discharge passage of said cup, yieldable means for the valve face of said bracket, resilient means for pressing the valve face of said cup, said yieldable means and the valve face of said bracket into fluid tight engagement with one another, and a handle fixed to said housing to facilitate rotating said housing relative to said bracket in one position to cause said discharge passages to register with one another and in the other position to cause said inlet passages to register with one another.

SAMUEL RAEMER.